Dec. 29, 1970     K. E. DODDS ET AL     3,551,058
COLOR RESPONSIVE APPARATUS
Filed July 25, 1969     2 Sheets-Sheet 1
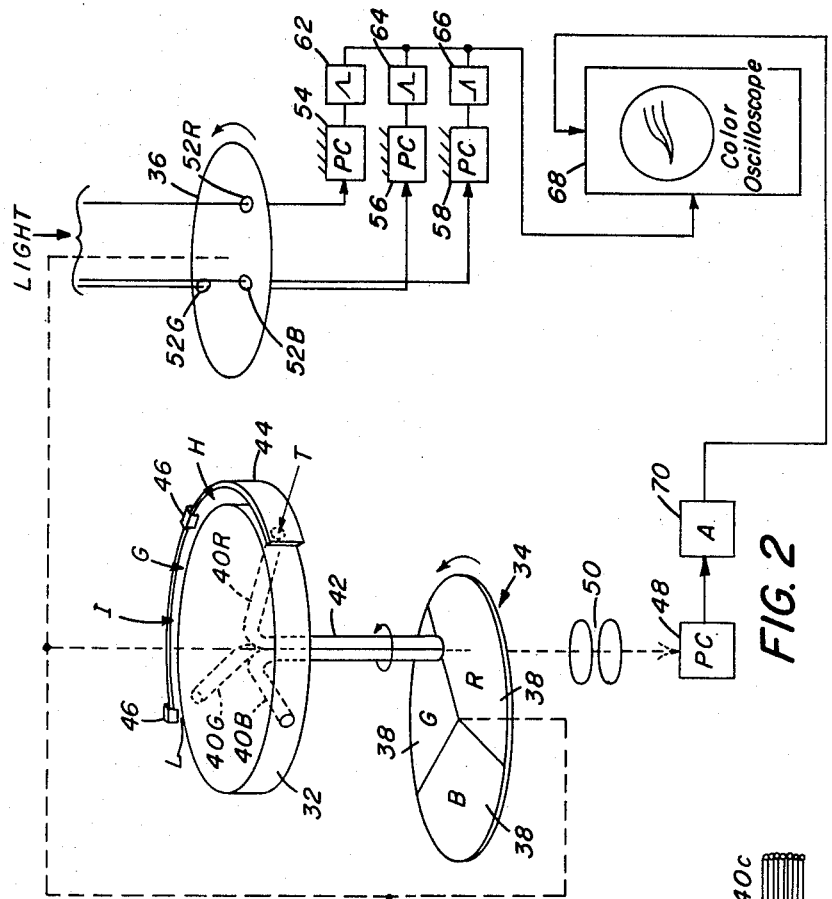
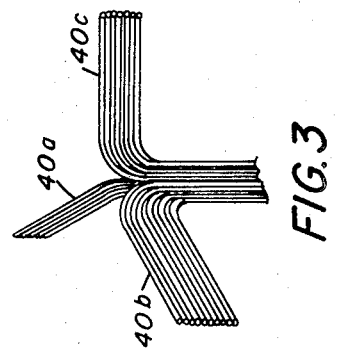
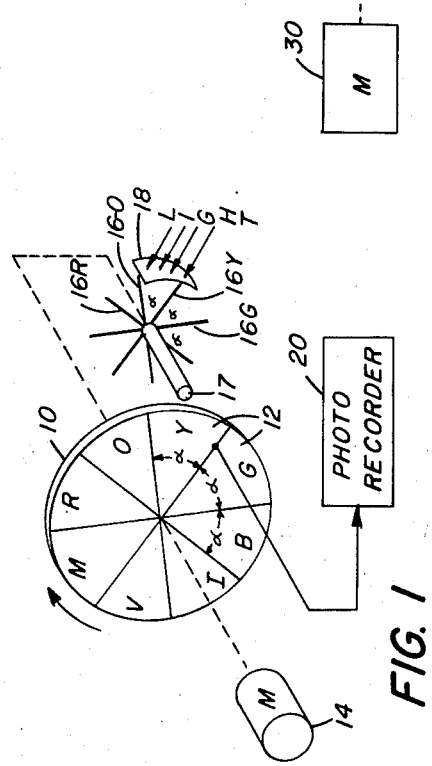
KAY E. DODDS
YING S. YEE
INVENTORS
BY
ATTORNEYS

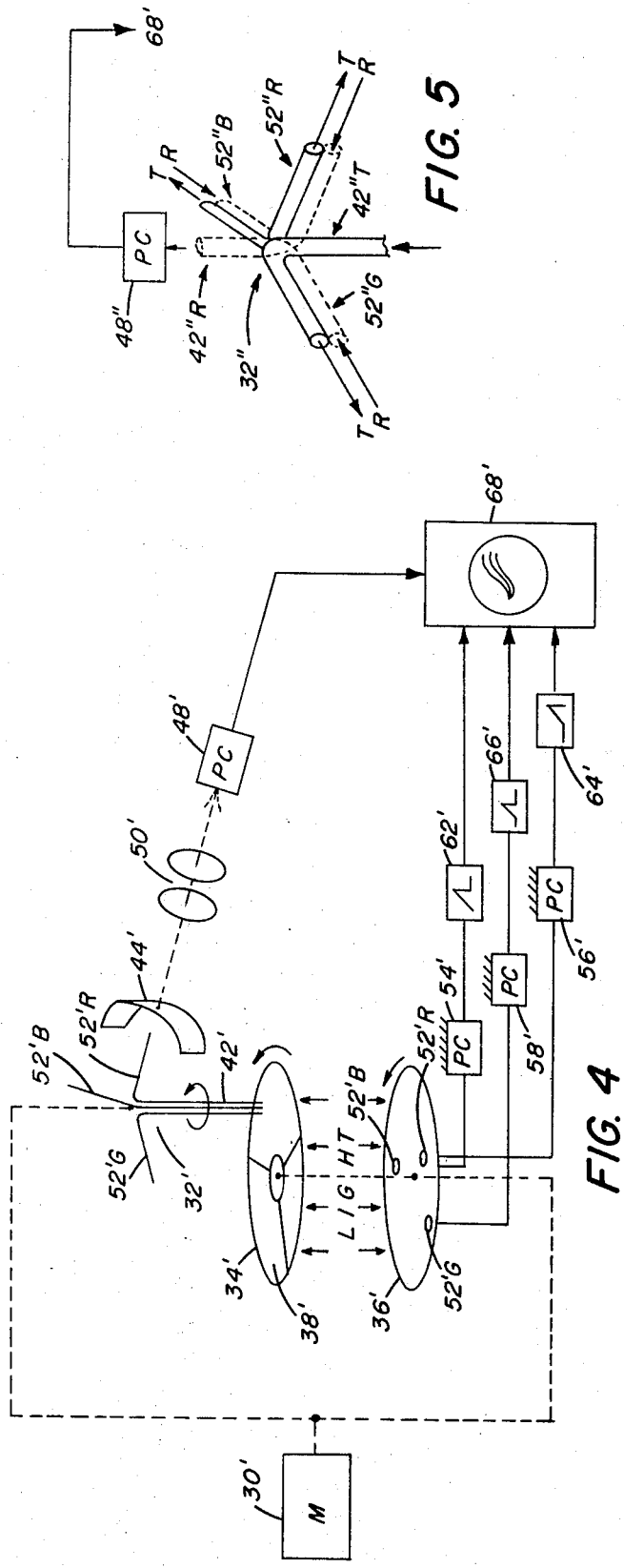

United States Patent Office 3,551,058
Patented Dec. 29, 1970

3,551,058
COLOR RESPONSIVE APPARATUS
Kay E. Dodds, Hilton, and Ying S. Yee, Rochester, N.Y., assignors to Eastman Kodak Company, Rochester, N.Y., a corporation of New Jersey
Filed July 25, 1969, Ser. No. 844,981
Int. Cl. G01j 3/48
U.S. Cl. 356—177
9 Claims

ABSTRACT OF THE DISCLOSURE

Apparatus for determining the color characteristics of a color strip is disclosed. Cast in the environment of a device for quickly determining the color densities of a wedge exposure, apparatus according to the invention matches strip length to the angular spacing between light spokes; and the number of light spokes to the number of color segments in a filter wheel. A color oscilloscope is employed to provide three color H and D traces, whereby a quick cursory evaluation of the strip may be had.

BACKGROUND OF THE INVENTION

Field of the invention

This invention relates in general to color measurements; and especially to such measurements as they apply to photography.

Description relative to the prior art

The production of high quality photographic films and papers requires considerable testing of such products before they are ready for sale. Test strips of color film, for example, are given respective (wedge) exposure intensities, and exposure times; fixing bath concentrations and temperatures, etc. As a result, quite a few processed strips, having corresponding sets of processing parameters, are produced; and these must be evaluated. Density (H and D curve) measurements to evaluate such strips, and their respective parameters, are time consuming, and thus costly—a matter compounded by the large number of sample strips which (usually) must be processed.

The import of the invention is to provide a quick screening of the density curves of various wedge exposure strips. Wedge exposure strips determined to be of interest may, thus, be segregated for further investigation (i.e., hard copy of the curves of interest may, as is now the practice, be provided by means of tracing pens); and those particular processing chemicals relevant to the segregated strips may be retained for further experimentation, modification, etc. Chemicals and strips for which there is no interest may be discarded immediately. Presently, processing chemicals—which will ultimately be discarded—are undesirably held in storage for an inordinate amount of time; or prematurely dumped.

The relevant prior art is typified by U.S. Pats. 2,544,196, 2,972,925 and 3,340,764.

SUMMARY OF THE INVENTION

The invention—which is cast in the environment of a color densitometer for descriptive purposes—is, in its presently preferred form, based on the following premise:

If a filter wheel having a number of equiangular color segments is rotated at the same speed as an array of the same number of light spokes (conduits) cooperative therewith; and if respective pairs of adjacent spokes subtend angles that approximately correspond with the radian (arcuate) length of a strip under inspection, then whatever light is transmitted through, or reflected from, the strip and passes through such spokes and filter wheel segments will be representative of the color characteristics of such strip.

As presently preferred, optical fibers are employed to implement the aforestated premise. Typically, a bundle of optical fibers are flared at one end thereof into three groups, with each such group being like a spoke on a wheel. The spokes, in pairs, subtend the same angle; and a strip of color film is arcuately disposed for inspection thereof near the ends of the fiber spokes. The length of the film strip is approximately the same as the arcuate distance between the ends of adjacent fiber spokes. White light is directed to pass through the film strip; and the fiber spokes are rotated about their common axis, and thus successively pick up light exiting from the film strip. A filter wheel having three similarly-sized segments (respectively in red, green and blue) is rotated in conjunction with the axial rotation of the fibers, the light from such fibers being directed to pass successively through the filter wheel segments. Whatever light passes through the fibers and exits from the filter wheel represents the red, green and blue colors which are present within the strip under inspection. A photodetector circuit, responsive to the existing light, applies its output to the vertical deflection circuit of a color oscilloscope; and synchronizing means is employed in conjunction with the oscilloscope to time its color traces to the rotation of the fibers and the filter wheel, whereby three (red, green and blue) H and D curves appear on the face of the oscilloscope. Retention of such film strip (and its corresponding processing chemicals), for additional evaluation, or discarding such strip, depends on what the oscilloscope traces indicate.

Within the purview of the aforestated premise—and more particularly in any such system wherein the product of spoke speed and number equals the product of filter wheel speed and number—the invention may be employed to measure reflectance-density as well as transmittance-density; it may be practiced with any number of light spokes; and to measure the intensities of any colors; it may employ other kinds of light spokes such, for example, as mirror systems; and it may be employed with a monochromatic oscilloscope; etc.

An object of the invention is to provide improved color responsive apparatus.

Another object of the invention is to provide a way to obtain quick color density information from a wedge exposure sample strip.

Another object of the invention is to provide an oscilloscope technique for producing plural H and D traces respectively representing the color densities within a sample wedge exposure strip.

The invention will be described with reference to the figures:

FIG. 1 is a diagram useful for describing application of the aforestated premise, FIG. 2 illustrates, in accordance with the invention, a transmittance-type densitometer embodying optical fibers, FIG. 3 is a perspective view illustrating a presently preferred optical fiber arrangement for practicing the invention, FIG. 4 is a view, similar to FIG. 2, illustrating another application of the aforesaid premise, and FIG. 5 indicates application of the invention to reflectance-density measurements.

Applying the aforesaid premise to the apparatus of FIG. 1, a filter wheel 10 has color segments 12. The segments 12 have the same angular dimensions $\alpha$; and the filter wheel 12 is rotated by a motor 14 which also rotates, at the same speed, an array of light spokes 16 having a common axis 17. To be noted is that—in this embodiment—there are eight filter wheel segments 12 and eight light spokes 16 (and that the light spokes are separated by the angle $\alpha$). A sample strip 18, e.g., a processed wedge exposure of photographic film, is illuminated by a source (not shown); and light exiting from the sample strip is picked up by the light spokes 16 as they scan the strip. The strip 18 has a radian length corresponding to the angle α; and light picked up by the rotating spokes 16 is directed through the filter wheel 10 to a photorecorder 20. As the wheel 10 and spokes 16 rotate, the light applied to the photorecorder 20 is successively representative of the yellow within the strip 18 (spoke $16_y$); of the orange within the strip 18 (spoke $16_o$); of the red within the strip (spoke $16_y$), etc.

Turning to FIG. 2, a presently preferred arrangement for practicing the invention includes a motor 30 for simultaneously driving, at the same speed, a scanning wheel 32, a filter wheel 34, and a timing wheel 36. The filter wheel 34 has three equiangular segments 38 of respective colors (red, green and blue); and the scanning wheel 32 has three light spokes 40 which are equally spaced apart. The light spokes 40 are optical fibers which are bunched about a common rotary axis 42 for the scanning wheel 32. A wedge exposure sample strip 44 is curved about the scanning wheel 32 by means of a holder 46; and the strip 44 has a radian length corresponding to 120 degrees (the angular distance between adjacent light spokes 40). White light is directed at and through the strip 44, the rotating light spokes 40 successively picking up such light, and axially directing such light successively through the filter wheel segments 38, to a photodetector 48 via optics 50.

The timing wheel 36 is provided with three apertures 52, each having a different radial distance from the rotary axis of the timing wheel 36. The apertures 52 have angular locations corresponding to the angular locations of the light spokes 40 and the demarcations between the segments 38. As the timing wheel 36 rotates, light pulses are successively applied to photodetectors 54, 56 and 58. The photodetectors 54, 56, 58 trigger respective time-displaced sawtooth voltages (circuits 62, 64, 66) which are applied, respectively, to the horizontal deflection circuit of a color oscilloscope 68. The output from the photodetector 48 is amplified (circuit 70) and applied to the vertical deflection circuit of the oscilloscope 68.

As the optical fiber 40R sweeps across the exit face of the sample strip 44, the red segment 38 of the filter wheel 34 sweeps across the axis 42 of the fiber bunch. During such sweeping the only light which can reach the photodetector 48 is red light proportional in intensity to the red within the sample strip; and the only sweep circuit which is triggered is the circuit 62, thereby causing a red H and D trace to appear on the scope face. As soon as the fiber 40R ends its sweep, the fiber 40B and the blue segment 38 of the filter wheel start to apply blue light to the photodetector 48, the sawtooth circuit 64 being triggered to cause a blue H and D trace to appear on the scope face. A green trace is similarly generated; and all such traces simultaneously show on the tube face because of phosphor persistance. Thus, a film tester need only slip a test strip into the holder 46 to obtain an immediate indication of the color densities within the strip.

The optical fibers of FIG. 3 form light spokes 40A, B, C each with a respective number of fibers corresponding to the system transmittability of red, green and blue colors. In other words, the signal output from photodetector 48 is, without a sample strip 44 in the holder 46, the same for the red, blue and green colors. By means of such an arrangement, the respective color H and D curves are provided with the same reference, as is the preferred practice.

Whereas the system of FIG. 2 contemplates light spokes picking up light exiting from the film strip sample, the invention is not so restricted and may instead employ light spokes for directing light through the sample strip. Referring to FIG. 4, a motor 30' simultaneously rotates timing, filter and scanning wheels 36', 34', and 32'. White light applied across the face of the filter wheel 34' passes therethrough, and is successively picked up by a bundle of optical fibers 52'G, B, R (optical wheel 32') as such fibers rotate about their common axis 42'. The fibers (light spokes) are equiangularly displaced from each other; and there is the same number of spokes as there are segments 38' in the filter wheel. Because the filter wheel 34' rotates, the fibers successively respectively direct green, blue and red light through a film test strip 44'. The test strip is radianly-sized as indicated above. Light exiting from the strip is collected by optics 50', and focused upon a photodetector 48'. A color oscilloscope 68', the vertical deflection circuit of which is successively actuated by "green," "blue" and "red" modulation, produces three color traces; the oscilloscope 68' having its three horizontal deflection circuits actuated, as above, by trigger circuits 54'–62', 58'–68', 56'–64'.

As indicated above, the invention may be employed for reflectance-type H and D measurements, and the general arrangement of the system of FIG. 4 is especially adaptable for this purpose: The fiber bundle 32" of FIG. 5 may be substituted for the scanning fibers of FIG. 4. The bundle 32" rotates about an axis 42", and has three light spokes 52"G, 52"B, and 52"R. Each spoke contains a transmitting portion; and a receiving portion. Red, green and blue light is successively applied via respective transmitting portions (42"T) to a sample strip 44'; and successively collected for application to a photodetector 48" by respective receiving portions 42"R. H and D reflectance-density curves for the sample strip are thereafter produced in the manner described above.

The invention has been described in detail with particular reference to preferred embodiments thereof, but it will be understood that variations and modifications can be effected within the spirit and scope of the invention. So long as the sample strip in question has a radian length as above described, and so long as the light spokes are angularly disposed and numbered in relation to the filter wheel as indicated, the general arrangement suggested by the invention obtains.

We claim:

1. Apparatus responsive to the color components within a strip comprising:
    (a) an array of light conduits rotatable about a common axis, to scan successively the length of said strip,
    (b) a rotatable filter wheel having a number of color segments, the common axis of said light conduits being substantially parallel to the rotary axis of said filter wheel, at least some of said conduits in said array being angularly spaced in relation to the arcuate length of said strip,
    (c) means for use in illuminating said strip with light,
    (d) means for simultaneously rotating the light conduit array and said filter wheel in a predetermined speed relationship which is such that respective combinations of wheel segments and conduits cyclically receive light from said strip, and
    (e) means responsive to light passing between said strip and said filter wheel via said light conduits.

2. Apparatus responsive to the color components within a strip comprising:
    (a) an array of light conduits rotatable about a common axis, the light conduits in said array being angularly spaced at angular intervals substantially corresponding to the arcuate length of said strip, said light conduits being oriented to scan successively the length of said strip,
    (b) a rotatable filter wheel having a number of similarly sized color segments equal in number to the number of said light conduits, the common axis of said light conduits being substantially parallel to the rotary axis of said filter wheel,
    (c) means for rotating the light conduit array and said filter wheel at the same speed,
    (d) means for use in illuminating said strip with light, and (e) means responsive to light passing between said strip and said filter wheel via said light conduits.

3. The apparatus of claim 2 wherein said light conduits are optical fibers.

4. The apparatus of claim 2 wherein said strip is light transmissive, and wherein said means responsive to light is photodetector means responsive to light passing through said filter wheel and through said strip.

5. The apparatus of claim 2 including:
 (a) an oscilloscope, one deflection circuit of which is adapted for cooperation with said light responsive means,
 (b) sweep circuit means cooperative with another of said oscilloscope deflection circuits, and
 (c) means for synchronizing the successive scans of said light conduits with the actuation of said sweep circuit means,
thereby to produce oscilloscope traces representative of the colors within said strip.

6. The apparatus of claim 2 wherein said strip is light reflective; wherein said conduits in said array transmit light at said strip; and wherein said light responsive means includes an array of light receiving conduits rotatable with said light transmitting conduits.

7. Apparatus for use in determining the color densities of a strip comprising:
 (a) means for arcuately holding said strip,
 (b) an oscilloscope having at least three means cooperative therewith for triggering the sweep of the beam of said oscilloscope,
 (c) a rotary filter wheel having equisized segments of three different colors,
 (d) an array of light conduits for scanning the arcuate length of said strip, said conduits being equal in number to the number of segments in the filter wheel, the conduits in said array being angularly disposed about a common rotary axis, and the angles between said respective pairs of adjacent conduits being each the same, and such angles being in correspondence with the arcuate length of said strip,
 (e) means for rotating said filter wheel and said array of conduits at the same speed, and said common axis for said array being so disposed with respect to said filter wheel that it points successively at the segments of said filter wheel as said wheel rotates,
 (f) means for synchronizing the actuation of said means for triggering to the scanning of said strip by the respective conduits, and
 (g) means for use in illuminating said strip with light,
 (h) means for receiving light and converting light to representative electrical signals for application to the vertical deflection circuit of said oscilloscope, said light having passed between said strip and successive segments of said filter wheel via successive ones of said conduits,
whereby three traces appear on the oscilloscope face representing the color wheel colors which are contained within the color strip.

8. The apparatus of claim 7 wherein said light conduits are optical fibers.

9. The apparatus of claim 8 wherein each said light conduit is comprised of a bundle of optical fibers, the number of fibers in each said bundle being respectively related to the system transmittability of the particular color carried thereby.

References Cited

UNITED STATES PATENTS 2,544,196  3/1951  Varden.
3,376,382  4/1968  McCalla.

FOREIGN PATENTS 632,593  11/1949  Great Britain.

OTHER REFERENCES

Ward, John W.: "An Automatic Digital Colorimeter for Laboratory and Process Control Applications," from American Dyestuff Reporter, vol. 55, Nov. 21, 1966, pp. 55–61.

RONALD L. WIBERT, Primary Examiner

T. MAJOR, Assistant Examiner

U.S. Cl. X.R.

356—188, 203